US005855480A

United States Patent [19]

Housman

[11] Patent Number: 5,855,480

[45] Date of Patent: Jan. 5, 1999

[54] WALLCOVERING SAMPLE CARD STORING UNIT

[75] Inventor: Lucrezia J. Housman, Annapolis, Md.

[73] Assignee: Brewster Wallcovering Company, Randolph, Mass.

[21] Appl. No.: 922,296

[22] Filed: Sep. 3, 1997

[51] Int. Cl.[6] .................... G09B 25/00

[52] U.S. Cl. .................... 434/75

[58] Field of Search .................... 434/72, 74, 75, 434/81, 98, 365, 367

[56] References Cited

U.S. PATENT DOCUMENTS

| | | | |
|---|---|---|---|
| 371,701 | 10/1887 | Parker | 434/98 |
| 402,859 | 5/1889 | Rose | 434/98 X |
| 1,045,372 | 11/1912 | Cohen | 434/75 |
| 1,978,925 | 10/1934 | Williams | 434/74 X |
| 2,748,499 | 6/1956 | Shafer | 434/74 |
| 2,890,531 | 6/1959 | Gracier | 434/75 |
| 4,104,809 | 8/1978 | Day et al. | 434/104 |
| 4,253,259 | 3/1981 | Schaffer et al. | 434/367 X |

*Primary Examiner*—Jeffrey A. Smith
*Attorney, Agent, or Firm*—Fish & Richardson, P.C.

[57] ABSTRACT

A portable unit stores sample cards with samples of wallcovering material and indicia identifying information associated with the sample of wallcovering material on the card.

11 Claims, 3 Drawing Sheets

WALLCOVERING SAMPLE CARD STORING UNIT

This invention relates to storing samples of wallcovering material on cards.

In general, the invention features a portable unit for storing sample cards with samples of wallcovering material and indicia identifying information associated with the sample of wallcovering material on the card.

Sample cards are stored in a portable unit which includes a container with a bottom and upright opposite sides, front, and back, and a cover with a top and upright opposite sides, front, and back. The cover removably closes the top portion of the container which stores sample cards in an upright fashion. The sample cards typically have heights and widths which are slightly smaller than those of the container.

Each sample card carries a sample of wallcovering material detachably secured to the upper portion, such as with pressure-sensitive adhesive, and indicia identifying characteristics associated with that wallcovering material on its lower portion.

These indicia typically include physical properties of wallcovering material as well as identifying information related to the supplier, the dealer, and installation of this wallcovering material. Physical properties may include, for example, the color, pattern, weight, type, width as supplied, and backing material of this wallcovering material. Information related to the supplier may include, for example, the brand name of this wallcovering material, the name of the supplier and the code designation for this wallcovering material. Information related to the dealer of this wallcovering material may include, for example, the name, address, phone number, and facsimile number.

Preferably, the wallcovering sample covers the entire area of the card between the top edge and the area at the bottom carrying the indicia. This covered area is more than the area at the bottom with the indicia.

The invention features a method of storing sample cards in a portable storing unit including a container and a cover. Sample cards may be arranged in an alphanumeric order of one of indicia of wallcovering material, for example, in the chromatic order or in the order of the codes designating the respective wallcovering materials.

Other features, objects, and advantages will become apparent from the following detailed description when read in connection with the accompanying drawings in which.

Figure 1:
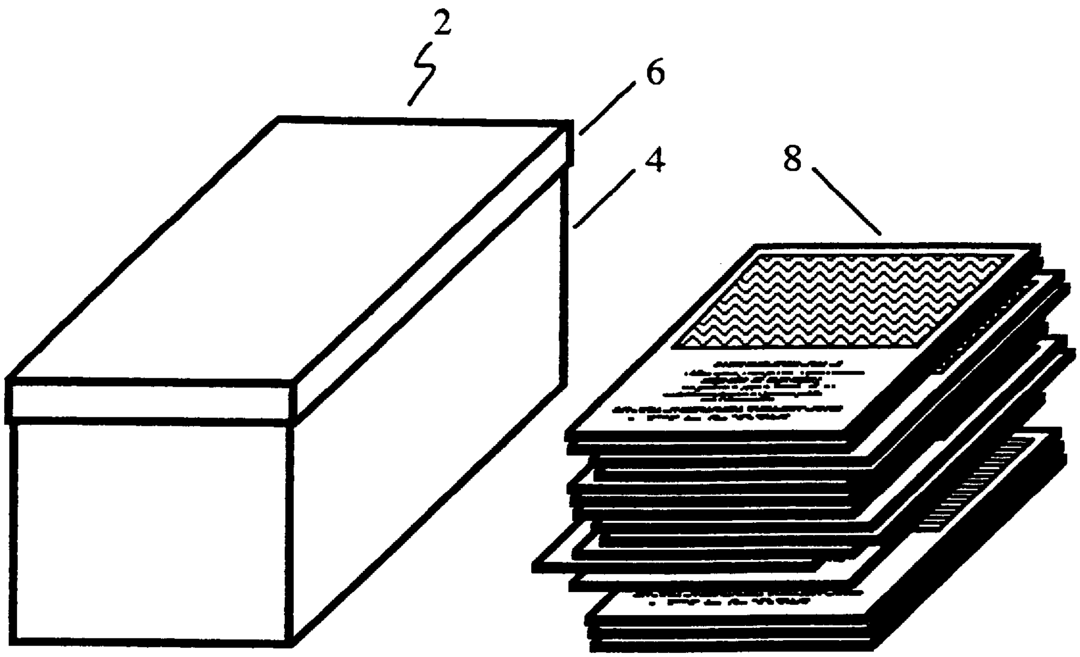
FIG. 1 is a perspective view of sample cards beside a covered portable storing unit.

Referring to FIG. 1, there is shown a portable card storing unit 2 comprising a container 4 and a cover 6 beside sample cards 8.

Figure 2:
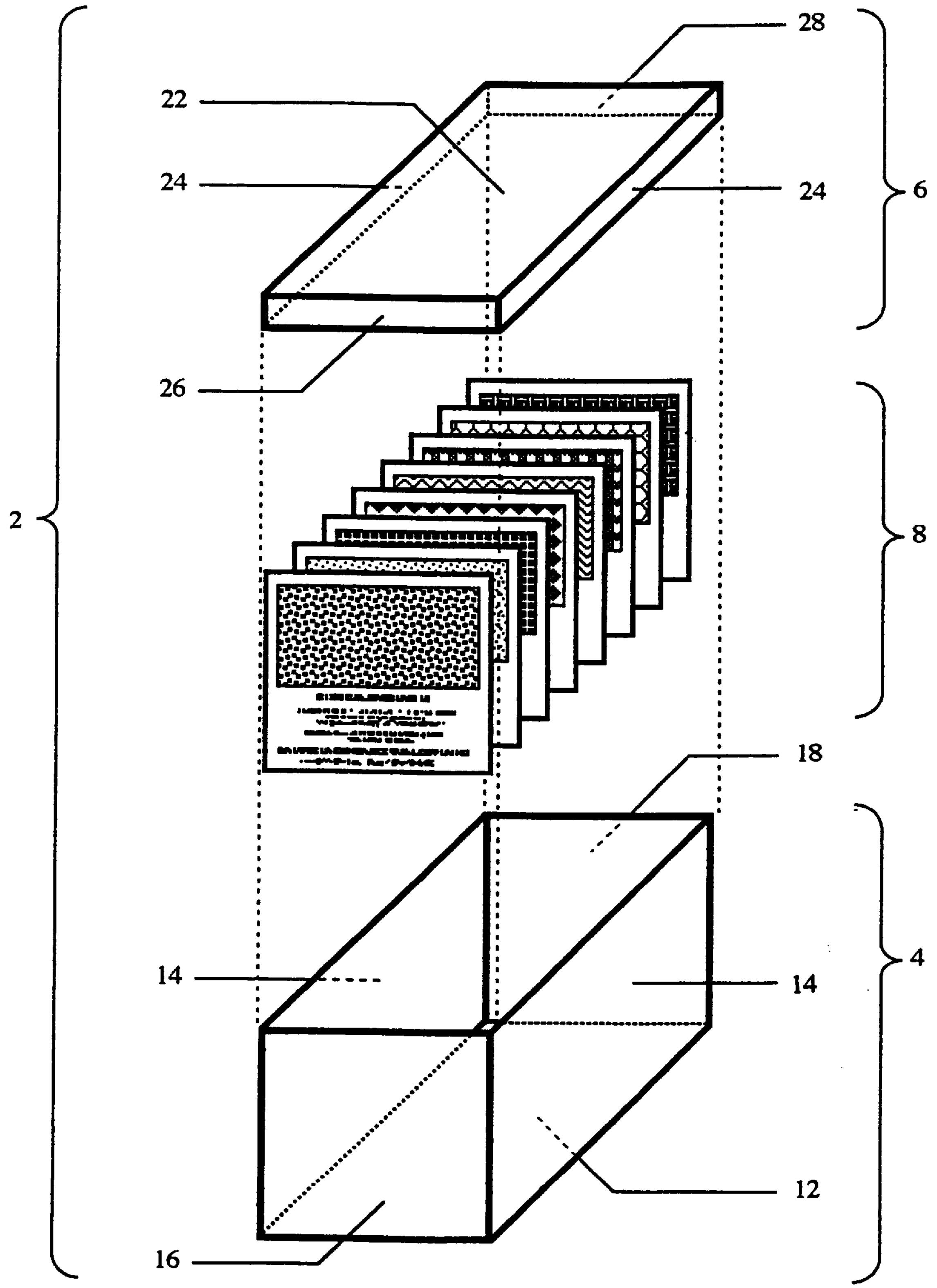
FIG. 2 is an exploded view showing the sample cards between the container of the portable storing unit and its cover.

Referring to FIG. 2, there is shown an exploded view with sample cards 8 between container 4 and cover 6. Container 4 has a bottom 12 and upright opposite sides 14, front 16, and back 18. Cover 6 has a top 22 and upright opposite sides 24, front 26, and back 28. The width and the height of container 4 are slighter larger than those of sample cards 8 so that sample cards 8 can fit into the container 4 in an upright fashion. Cover 6 is constructed with width and length slightly larger than those of container 4 such that, in a closed position, cover 6 snugly embraces the top of container 4.

Figure 3:
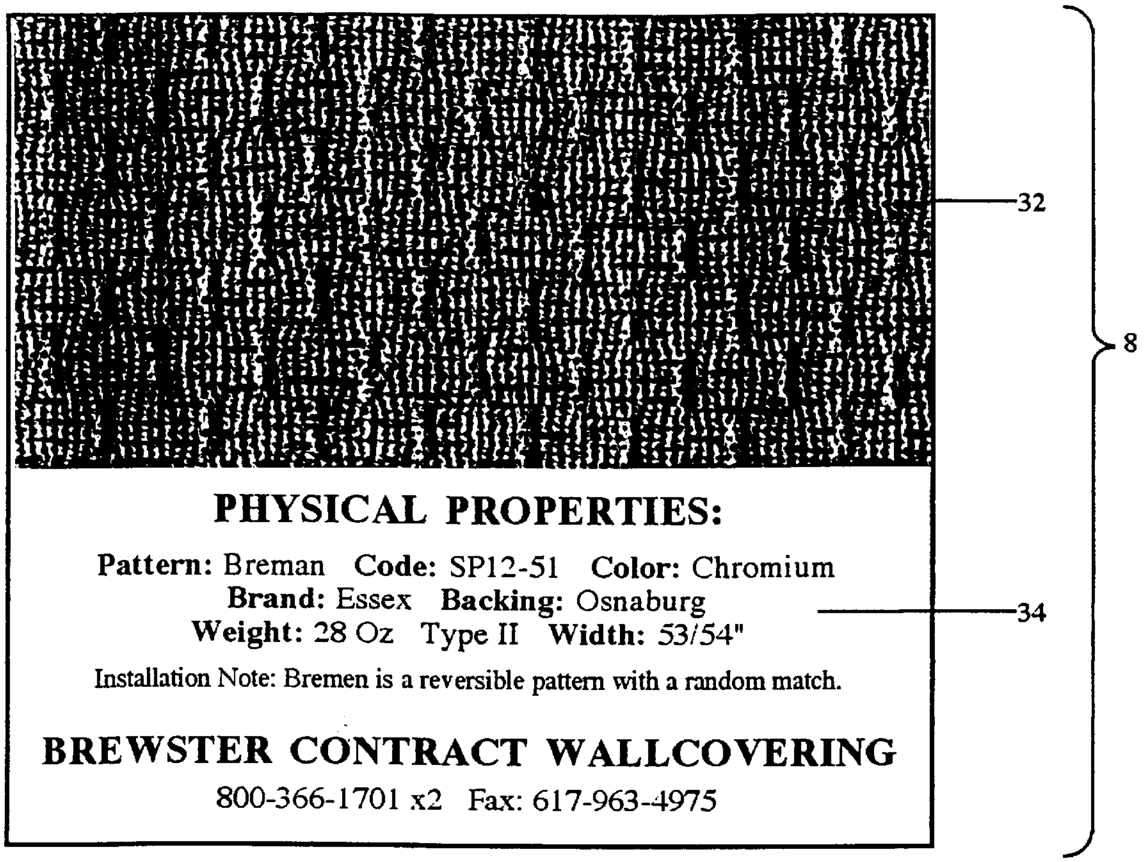
FIG. 3 is an exploded view of a typical configuration of a sample card which is provided with a sample of wallcovering material and indicia identifying characteristics associated with wallcovering material on the sample card.

Referring to FIG. 3, a sample card 8 carries a sample 32 of wallcovering material and indicia 34 identifying characteristics associated therewith. Sample 32 of wallcovering material may be detachably secured to the upper portion of sample card 8 with indicia 34 written, typed, or printed on its lower portion. The indicia 34 typically characterize physical properties of wallcovering material corresponding to the sample on the card and information related to the supplier, the dealer, and installation of the wallcovering material.

A typical sample card 8 may include indicia identifying physical properties of wallcovering material such as the pattern, code, color, backing material, weight, type, and width of wallcovering material as supplied by the manufacturer, the supplier of the wallcovering material, and the dealer of the wallcovering material such as the name, address, phone number, and facsimile number.

Sample cards 8 are stored in the portable card storing unit 2 and may be arranged in the alphanumeric order of one of the above indicia. For example, the sample cards 8 may be arranged in the chromatic order or in the alphabetical order of the brand name, or numerical order of numbers identifying the different wallcovering materials.

The invention has a number of advantages. Locating the sample 32 of wallcovering material at the top of the sample card 8 covering an area larger than that at the bottom with the indicia 34 facilitates observation of a number of different samples 32 by flipping through the cards 8 seated in container 4. A particular card 8 may be easily removed for closer observation. Detachably securing the sample 32 of wallcovering material, such as with a pressure-sensitive material, allows easy removal of the sample 32 from the card 8 for better inspecting and feeling the sample material and reattachment to the sample card 8 after this inspection. Placing the indicia 34 in the area below the sample 32 facilitates ordering wallcovering material corresponding to the sample 32.

Other embodiments are also within the scope of the following claims. In addition to the configuration illustrated in FIG. 3 where the sample 32 is detachably secured at the top of the sample card 8, a sample card 8 may have another configuration of detachably securing the sample 32 on the right or left side of the sample card 8 covering an area larger than that on the other side with indicia 34. A sample card 8 may have another configuration of detachably securing a sample 32 of wallcovering material which is folded so as to fit an edge portion of the sample card 8. This configuration allows detachably securing a sample 32 of relatively large size only to cover a relatively small area on the sample card 8.

The portable card storing unit 2 may be constructed to have dimensions sufficient to store more than one row of sample cards 8, and such a storing unit may include one or more dividers therein to separate the plurality of rows of sample cards.

It is to be understood that while the invention has been described in conjunction with the detailed description thereof, the foregoing description is intended to illustrate and not limit the scope of the appended claims. Other aspects, advantages, and modifications are within the scope of the following claims.

What is claimed is:

1. A portable wallcovering sample card storing unit comprising, a container having a bottom, front, back and opposite sides, and a plurality of sample cards each having a sample of wallcovering material and indicia identifying information associated with said wallcovering material, said sample cards removably stored in said container in an upright fashion, said sample cards having heights and widths slightly smaller than those of said container, each of said sample cards provided with said sample of said wallcovering material on a first portion of said card, each of said sample cards provided with said indicia identifying said information associated with said wallcovering material on a second portion thereof, wherein said sample of wallcovering material is configured to be detachably secured on said first portion of said card, said first portion comprising at least one edge of said sample card, said indicia provided on said second portion of said sample card.

2. A portable wallcovering sample card storing unit in accordance with claim 1 wherein said indicia comprise structures identifying information on physical properties of said wallcovering material and related to at least one of the supplier of said material, the dealer, and installation of said wallcovering material.

3. A portable wallcovering sample card storing unit in accordance with claim 2 wherein said indicia comprise structure identifying information related to said supplier of said wallcovering material comprising the brand name of said wallcovering material.

4. A portable wallcovering sample card storing unit in accordance with claim 2 wherein said indicia comprise structure identifying information related to said supplier of said wallcovering material further comprising the name of said supplier and the code identifying said wallcovering material.

5. A portable wallcovering sample card storing unit in accordance with claim 2 wherein said indicia comprise structure identifying information related to said dealer comprise the name, the phone number, and the facsimile number of said dealer.

6. A portable wallcovering sample card storing unit in accordance with claim 2 wherein said indicia comprise structure identifying information related to said dealer further comprise the street address and the e-mail address of the dealer.

7. A portable wallcovering sample card storing unit in accordance with claim 1 wherein said indicia comprise structure identifying information related to at least one of the color, the pattern, the weight, the type, the width as supplied, and the backing material of said wallcovering material.

8. A portable wallcovering sample card storing unit in accordance with claim 1, wherein said sample card sorting unit further comprises a cover having a top, front, back and opposite sides, said top having the height and the width slightly greater than those of said container, said top removably closing the top portion of said container in a closed position.

9. A portable wallcovering sample card storing unit in accordance with claim 1, wherein said first portion is at the top of said sample card and said second portion is at the bottom of said sample card.

10. A portable wallcovering sample card storing unit in accordance with claim 1, wherein said sample of wallcovering material covers an area larger than that covered by said indicia.

11. A portable wallcovering sample card storing unit in accordance with claim 1, wherein said sample of wallcovering material is configured to be folded and be detachably secured on said sample card.

* * * * *